No. 621,711. Patented Mar. 21, 1899.
N. E. RICHARDSON.
LUNCH BUCKET.
(Application filed Dec. 24, 1898.)
(No Model.)
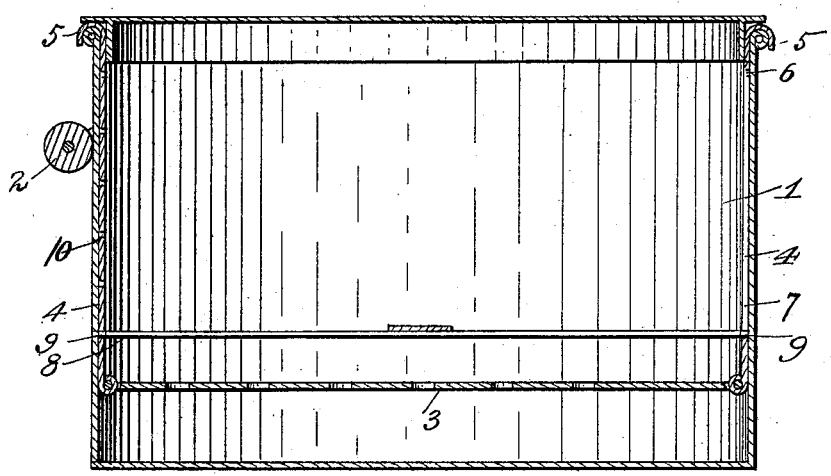
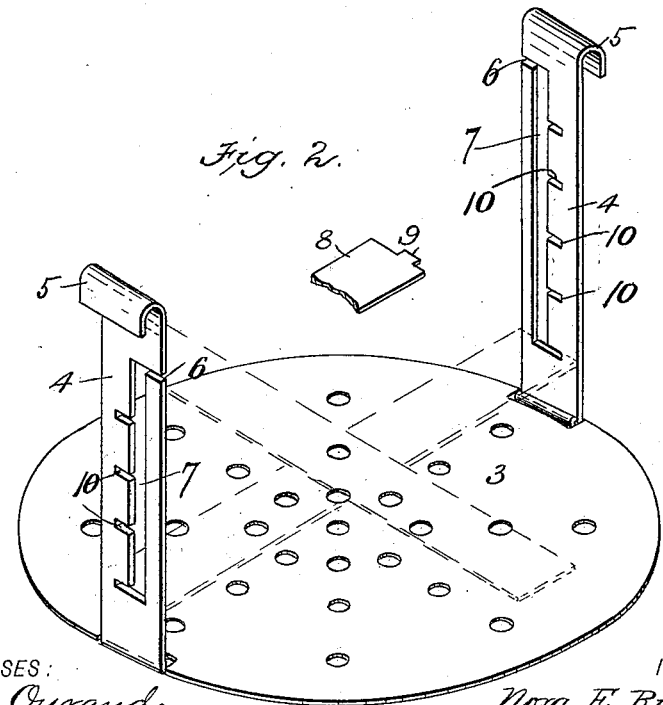
WITNESSES: Franck L. Ourand, Jos. L. Coombs
INVENTOR: Nora E. Richardson,
BY Sass Bagger & Co.
ATTORNEYS

UNITED STATES PATENT OFFICE.

NORA E. RICHARDSON, OF CORSICA, OHIO.

LUNCH-BUCKET.

SPECIFICATION forming part of Letters Patent No. 621,711, dated March 21, 1899.

Application filed December 24, 1898. Serial No. 700,260. (No model.)

*To all whom it may concern:*

Be it known that I, NORA E. RICHARDSON, a citizen of the United States, residing at Corsica, in the county of Morrow and State of Ohio, have invented new and useful Improvements in Lunch-Buckets, of which the following is a specification.

My invention relates to lunch-buckets principally designed for the use of picnic and other like parties for conveying articles of food.

It has long been a desideratum to provide a lunch-bucket in which articles of food, such as pies and cakes, can be conveniently packed and transported without liability of being injured or broken and when the bucket is not in use for carrying food may be employed for other purposes or for domestic uses.

The object of the invention is to provide an improved construction of lunch-bucket which shall possess superior advantages with respect to efficiency in use.

The invention consists in the novel construction and combination of parts hereinafter fully described and claimed.

In the accompanying drawings, Figure 1 is a central longitudinal section of a lunch-bucket constructed according to my invention. Fig. 2 is a perspective view of one of the plate-supports.

In the said drawings the reference-numeral 1 designates an ordinary cylindrical bucket or pail provided with a handle 2. This bucket may be of any size desired, but is preferably of such size as to fit under the seat of any ordinary buggy or other vehicle. Located in said bucket is a support 3, consisting of a plate or disk of perforated metal provided with diametrically opposite upwardly-extending arms 4, which are hinged to the edge of said plate. The ends of these arms are bent into hooks 5, which engage with the upper end of the bucket and hold the support a short distance above the bottom of the bucket. Each of these arms at opposite edges is formed with a slot 6, which intersects with a vertical slot 7, with which engages plate-supports 8, consisting of two rectangular metal bars crossing each other at right angles and connected or secured together. One of these bars at each end is formed with a lug 9. The edges of the arms 4 opposite the slots 6 are formed with a series of slots 10, with which the lugs 9 are adapted to engage.

In using the bucket a pie upon a suitable plate is placed in the bucket. The support is now placed in the bucket, the hooked ends of the hinged arms engaging with the upper edge of the bucket and holding the support above the pie just placed in the bucket and out of contact therewith. A pie or other article is then placed on the support, and then one of the plate-supports is placed in the bucket, the lugs 9 of one of the arms or bars thereof passing through the slots 6 in the hinged arms and the lugs 8 engaged with the slots 10, so as to securely hold the said holder in place. As will be seen, there are a number of these slots 10, so that the said plate-holders can be held at the proper height.

When not employed as a lunch-holder, the plate-holders can be removed and the bucket used for domestic purposes, the perforated plate serving as a steamer for cooking various articles of food, or the said plate may also be removed and the bucket used as an ordinary pail. The said perforated plate and the plate-holders may be made of wire, if desired, without departing from the principle of my invention.

Having thus fully described my invention, what I claim is—

1. The combination with a bucket, the perforated plate located therein and the arms hinged thereto having their upper ends bent into hooks adapted to removably engage the upper edge of the bucket, of the arms located above said plate and suspended from said hinged arms, substantially as described.

2. The combination with a bucket, of the perforated plate, the arms hinged thereto formed with slots in opposite edges and with intersecting vertical slots, the edges of which are formed with a series of slots, and the upper ends of said arms bent into hooks removably engaging with the upper end of the bucket and the plate-holder consisting of the bars secured to each other having lugs at their ends engaging with the slots in the edges of vertical slots in said hinged arms, substantially as described.

In testimony whereof I have hereunto set my hand in presence of two subscribing witnesses.

NORA E. RICHARDSON.

Witnesses:
H. E. DUDLEY,
CARRIE DUDLEY.